United States Patent [19]

Wilson

[11] Patent Number: 4,577,133

[45] Date of Patent: Mar. 18, 1986

[54] FLAT PANEL DISPLAY AND METHOD OF MANUFACTURE

[76] Inventor: Ronald E. Wilson, 54 S. 860 E., Orem, Utah 84057

[21] Appl. No.: 546,103

[22] Filed: Oct. 27, 1983

[51] Int. Cl.$^4$ .............................................. H01J 31/26
[52] U.S. Cl. .................... 313/103 CM; 313/105 CM; 313/422; 445/24; 445/47
[58] Field of Search ................. 445/24, 47, 49, 52; 313/422, 103 CM, 105 CM

[56] References Cited

U.S. PATENT DOCUMENTS 3,885,180  5/1975  Carts, Jr. .................... 313/103 CM
3,935,500  1/1976  Oess et al. .................... 313/422

FOREIGN PATENT DOCUMENTS 0025221  3/1981  European Pat. Off. ............ 313/422
1168415  10/1969  United Kingdom ........ 313/103 CM
1440037  6/1976  United Kingdom ........ 313/103 CM

*Primary Examiner*—Arthur Kellogg

[57] ABSTRACT

A flat panel display for video and/or information display including a geometric array of individually energizable, low energy electron emitters in combination with an array of continuous channel electron multipliers for amplifying and directing the electron outputs of the emitters onto a phosphor screen to emit visible light.

28 Claims, 8 Drawing Figures

FLAT PANEL DISPLAY AND METHOD OF MANUFACTURE

The present invention relates to a flat panel display device and more particularly to a high resolution, full color display operable at low voltages.

BACKGROUND OF THE INVENTION

The CRT has been the dominant technology in the information display field. This has been due in part to the fact that the raster CRT was developed for TV and was readily adapted for digital information displays when the need arose. The CRT has the advantages of a bright, phosphor screen with full color capability and reasonable cost. However, the three-dimensional space requirements and the serial nature of the CRT, which restricts both the resolution and the refresh rate, have disadvantages. In addition, the narrow band width has posed problems in transmitting and displaying the image. These characteristics of the CRT have created a need in the industry for an alternate form of display.

Flat panel displays have a number of inherent advantages over CRTs for the display of an image, whether video or data, in that the image is well focused over the entire display area and the addressing of the display surface is done in a parallel fashion and is amenable to the use of digital circuitry. In addition, the flat panel displays are compact and easily portable, they are simple to mount on horizontal or vertical surfaces, and the position can be easily adjusted to accomodate the desires of the individual operator. Recent advances in integrated circuit technology, wherein more complex circuitry is now available in smaller dimensions and at reduced cost, have made their use in displays more desirable. Current flat panel display technology utilizes integrated circuit technology, but requires the use of high voltage drivers. A variety of technological approaches have been proposed in pursuit of a practical flat panel display, including plasma, electroluminescent, gas electron phosphor and liquid crystal devices. Of these, the ac plasma and electroluminescent devices have attracted particular interest, but the use of either for high resolution display has been limited by the fact that full color is difficult to achieve and the voltage levels required to achieve the desired levels of contrast and brightness have necessitated large, special purpose integrated circuits for the drivers. The resultant cost has made such displays unattractive for all competitive applications where cost is a consideration. Liquid crystal displays operate at low voltage, but as the resolution and density increase the drive complexity correspondingly increases. In addition, liquid crystals have slow response times, limited operating temperature range and limited ability to produce color.

The conventional ac plasma display panel consists of two glass plates hermetically sealed around the periphery. A narrow gas chamber is maintained between the plates, which is filled with a mixture of neon-argon gas. Orthogonal conductors are printed on the interior surfaces of the glass plates, which are subsequently covered with a thin dielectric layer overcoated with magnesium oxide. When the proper ac voltages are applied between orthogonal conductors, a plasma discharge occurs at the selected conductor intersection. This emits light and forms a pixel (picture element).

A plasma that serves as an electron source, rather than a light source, has been developed by Siemens, A.G. and described in Electronics, Dec. 15, 1982, pages 128-130. This plasma-discharge flat panel includes an electron source, a control plate having orthogonal control electrodes deposited on opposite surfaces thereof, and a phosphor target all packaged in a hermetically sealed, glass enclosure. An acceleration electrode is energized with about 4000 v to draw electrons from the continuous dc plasma discharge between the rear cathode and anodic rows on the control plate. The electrons are accelerated through holes located at each intersection of the electrodes on the control plate to excite phosphors on the target. The potential applied at each intersection is controlled with a 50 v bias to govern the total electron current streaming through each hole. Special integrated circuits using double-implanted MOS technology handle the 50 volt pulses at the frequency needed for proper image construction.

OBJECTS AND SUMMARY OF THE INVENTION

An object of the present invention is to provide a full color high resolution flat panel display.

Another object is to provide a flat panel display which utilizes a low energy electron emitter as an electron source.

A further object is to provide a flat panel display in which an electron stream from a low energy emitter is amplified to a level sufficient to excite a phosphor screen.

An additional object is to provide a flat panel display which utilizes low voltage drivers for addressing the display.

A further object is to achieve an ultra high resolution flat panel display through the use of low voltage drivers and manufacturing techniques.

The above objects are realized in the present invention by provision of a flat panel display which includes a low energy electron source, an electron multiplier and a phosphor screen combined in a vacuum sealed, two-dimensional array. A geometric array of low energy electron emitters is positioned in close proximity with an array of continuous channel electron multipliers which amplify the electron outputs of the emitters and direct them onto the phosphor to emit visible light.

DRAWINGS

The best mode presently contemplated of carrying out the invention will be understood from the detailed description of the several embodiments illustrated in the accompanying drawings in which.

DETAILED DESCRIPTION OF THE ILLUSTRATED EMBODIMENTS

The present invention avoids many of the problems of the prior approaches to providing a flat panel display by utilizing a low energy emitter as a source of electrons to excite a phosphor screen. The phosphors presently available require bombardment by a stream of high energy electrons to achieve usable levels of illumination. The electron output from the low energy emitter is inadequate to provide an acceptable level of phosphor excitation, therefore, an electron multiplier is provided to amplify the output from the emitter and induce a cascade of electrons sufficient to activate the phosphor on the screen.

Figure 1:
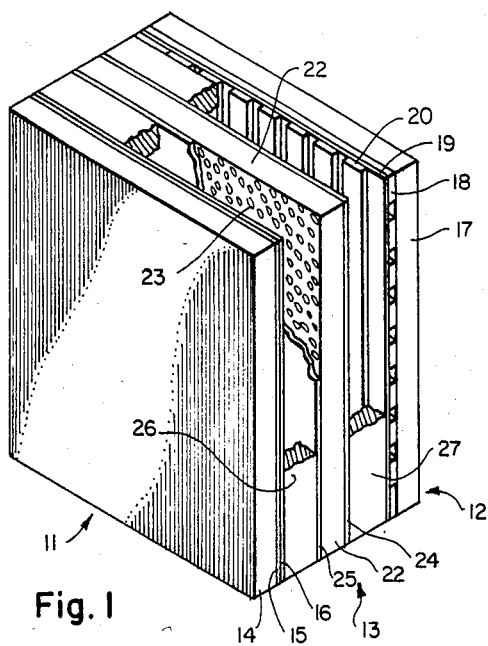
FIG. 1 is a perspective view partly in section of a flat panel display according to the present invention.

Referring to FIG. 1 of the drawing, the present flat panel display includes a phosphor screen 11, a low energy electron emitter mechanism 12 and an electron multiplier 13 positioned in close proximity within a vacuum and configured in a two-dimensional array. The multiplier is positioned between the emitter and the screen and is maintained in spaced relation thereto by peripheral spacers 26 and 27. Glass plates 14 and 17, which support the phosphor 15 and emitter mechanism respectively, form the front and rear surfaces of the display panel. Plates 14 and 17 support the vacuum in the interior of the panel and their thickness depends upon the force of the vacuum and the strength of the glass used.

Figure 2:
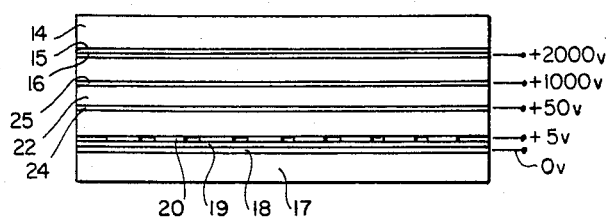
FIG. 2 is an elevation view at an enlarged scale of a cross-section of the panel of FIG. 1.

The phosphor screen 11 comprises a flat plate of glass 14 approximately ¼ inch thick with a thin layer of phosphor 15 deposited on the inner surface thereof. For a monochrome display a single phosphor is applied uniformly over the entire surface of the plate 14. For a full-color display, red, green and blue phosphors are oriented in groups of three and applied in bands or dots at the appropriate pixel locations. As shown in FIG. 2 a thin layer of aluminum 16 can be applied over the phosphors to serve as an optical reflector and charge-dissipation mechanism and to provide a bias voltage if needed. Since the electron excitation of phosphor in the present display is similar to that in CRTs, the phosphors can be applied to the front plate 14 with the same methods conventionally used in the manufacture of CRTs. A discussion of phosphor screens, their characteristics and methods of manufacture is contained in Electronic Engineers Handbook, Donald G. Fink, McGraw-Hill 1975, pages 11-33 to 11-39.

Figure 3:
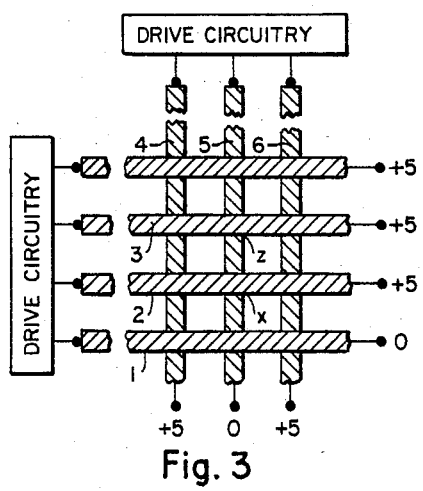
FIG. 3 is a plan view of a portion of a low energy emitter.
Figure 4:
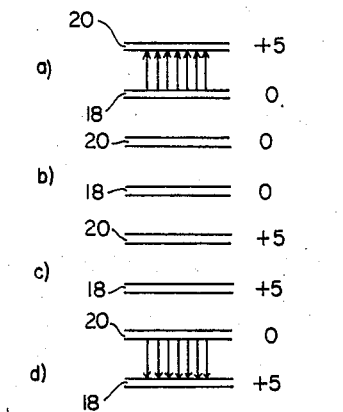
FIG. 4 is a diagrammatic view of electron flow in the emitter of FIG. 3 under various conditions.

The low energy emitter mechanism 12 is a tunnel emission structure supported on a glass substrate 17 approximately ¼ inch thick. As shown in FIG. 2 the structure includes parallel rows of narrow metal conductors 18 in close proximity to each other, a layer of dielectric 19 and closely parallel columns of narrow metal conductors 20 in orthogonal relation to the rows. FIG. 2 also contains a simplified showing of sample voltages employed to establish the electric fields within the panel to accelerate the electrons from the emitter to the screen and illustrates the voltage levels used in the selection process, which are on the order of 0-20 volts. A layer of conductive metal of appropriate work function, such as aluminum, indium, or gold etc., is deposited on the glass substrate and then etched to form the closely-parallel rows of conductors 18 along with connectors for attachment to driver circuitry. A thin film of a suitable dielectric 19, such as aluminum oxide, silicon nitride, silicon dioxide, etc., is deposited over the rows of conductors. A layer of conductive metal of appropriate work function, such as gold, tungsten, indium or etc., is deposited on the dielectric and then etched to form the closely-parallel columns 20 with their connectors for attachment to driver circuitry. Conventional techniques of deposition and etching are employed in producing the emitter mechanism. A discussion of tunnel emission devices and methods of manufacture is found in Physics of Semiconductor Devices, by S. M. Sze, Wiley and Sons 1969, pages 607-613. When the conductors are energized, electron emission occurs at the crossover points of the rows and columns which correspond to the location of each picture element. As depicted in FIGS. 3 and 4, an appropriate voltage applied between between a particular row and column, with the top conductor more positive than the bottom, causes electron emission. A plus 5 volts applied to rows 2 and 3 and to columns 4 and 6, with row 1 and column 5 both at zero volts, causes emission to occur at crossover points x and z. The response of the emitters under various conditions is shown in FIG. 4 a-d with electron emission at condition a, no emission at b and c, and emission in the wrong direction at d. The voltage levels illustrated are desirable, but lower or higher voltage, for instance 2 to 20 volts, may be used. The electrons tunnel from the lower conductor, through the dielectric and through the top conductor into the vacuum. The voltage necessary to activate the emitter is proportional to the thickness of the dielectric. Therefore, the minimum thickness of dielectric is used to minimize the voltage requirements. In addition, the horizontal spacing between adjacent conductors in the rows and columns is a function of the voltage applied. The minimum spacing required to prevent arcing between conductors is less at low voltage than at high voltage. The resolution of the display is determined by the number of picture elements (pixels) per unit area and each pixel location coincides with a cross over point of the rows and columns of conductors. Therefore, since the conductors can be positioned closer together at low voltage, the resolution of the display can be considerably greater at low voltage than at high voltage. The low energy emitter has low power requirements for energizing and for switching which can be accomplished by mass produced, low voltage components, such as TTL or CMOS or etc compatible integrated circuits.

Figure 5A:
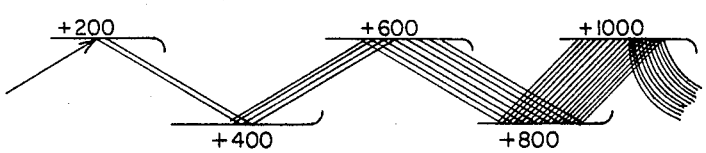
FIG. 5a and 5b are elevation views of two types of prior art electron multipliers.
Figure 5B:
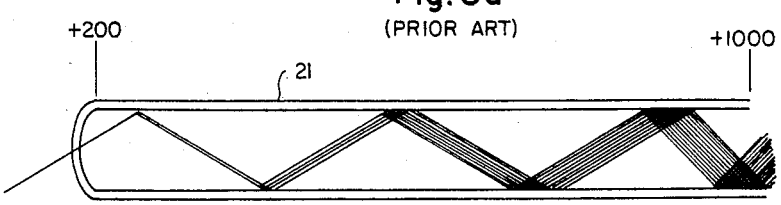

The electron multiplier 13 is a two dimensional array of cintinuous channel electron multipliers. An electron multiplier utilizes two basic facts: (1) that electrons are electrically charged particles, therefore their energy can be increased by acceleration in an electric field, and (2) that certain matrials have the characteristic of secondary surface emission, i.e., electrons can be knocked free by the impact of an incoming electron. Electron multipliers have been employed as the amplifying components of photomultiplier tubes. As shown in FIG. 5a, metal electrodes are given progressively higher positive potentials and are arranged so that the electrons leaving one electrode are directed toward the next. An incident electron that strikes the first electrode knocks several low-energy electrons out of the metal. The secondary electrons are accelerted to the second electrode, where they are multiplied again. Succesive multiplications lead to an exponential growth in the electric charge liberated by the initial electron. Since all the electrons are accelerated by the field, the combined energy of the electrons that finally strike the anode can be enormously greater than it is when a single electron is accelerated. To retain the high gain achieved without the consequent dispersion of the cascading electrons, a continuous channel electron multiplier is provided. As illustrated in FIG. 5b, a continuous channel electron multiplier consists of a glass tube 21 with a voltage applied on each end. The tube confines the electron cascade to the bore of the channel and one such multiplier is provided for each picture element in the display. The wall of the tube has the characteristics of secondary surface emission and the axis of the tube is positioned at an angle to the electric field which results from the applied voltage. Electrons passing through the multiplier collide with the wall and ricochet along the tube. Each time an electron collides with the wall, one or more secondary electrons are dislodged from the surface. The secondary electrons are accelerated in the electric field and in turn collide with the wall inducing a cascade of electrons. The cascade is directed by the tube onto the anode. Due to the strength of the field, approximately 1000 volts, the electron stream moving in the field is amplified within the multiplier both in quantity and velocity, to a level that will effectively excite the phosphors on the screen 11.

Referring to FIGS. 1 & 2, the electron multiplier includes a glass layer 22 approximately 1 mm thick with a chemical makeup of approximately 50% lead oxide, 40% silicon dioxide and 10% various alkali oxides. Holes 23 are etched through the plate from top to bottom by means of reactive ion beam etching techniques. The aspect ratio of hole diameter to hole length is determined by the electron amplification desired and is on the order of 1 to 20. After the holes have been etched, the glass is baked in a hydrogen atmosphere at 400 C for several hours to produce a semi-conducting surface a few micrometers deep. Such surface has the secondary surface emission characteristic and is the source of electrons for the multiplication process. When the baking is completed a conductive metal layer 24, 25 is deposited over the entire surface of the plate on both sides. The metal deposition on each side should be made at an acute angle to the plate to minimize the amount of metal that enters the holes. While the above glass composition is particularly useful, other glass compositions which can be treated to provide the secondary surface emission characteristic or mavy semi-conducting materials.

As an alternative, the electron multiplier can be made of square silicon wafers assembled into the size desired. The silicon wafers have a property that allows them to be preferentially etched along crystal lattice lines. The etch ratio is on the order of 400 to 1. Accordingly, a rectangular hole can be provided which is much smaller than required for an electron multiplier. Silicon, being a semi-conductor has the secondary surface emission characteristic and will act as a multiplying material without baking.

Figure 6:
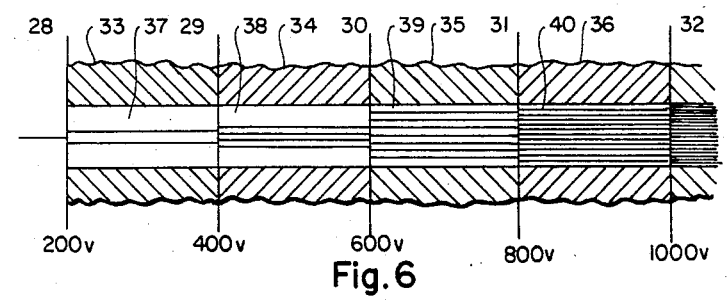
FIG. 6 is an elevation view of an improved electron multiplier.

An alternative embodiment of a continuous channel electron multiplier is illustrated in FIG. 6 as including several electrodes 28-32 separated by layers of dielectric material 33-36. The electrodes are formed of sheets of metal, such as aluminum, gold or suitable alloys of gold, having the secondary surface emission characteristic, and the dielectric layers are provided with small openings 37-40. The openings are aligned to form a continuous channel which is crossed at regular intervals by the electrodes. The resultant laminated structure may be formed by deposition of the various metal and dielectric layers or by securing pre-formed layers together or by a combination of such process. A bias voltage is applied across the multiplier and is stepped in increments between electrodes. An electron impinging against the outer surface of the initial electrode 28 dislodges one or more secondary electrons from the opposite surface which are accelerated within channel segment 37 to strike the next electrode 29 and dislodge additional electrons from the opposite surface into channel segment 38. Since the electrodes are maintained at successively higher voltages a cascade of electrons is induced across the multiplier. The dielectric material confines the electron cascade within the channel segments until it is discharged onto the phosphor screen.

Figure 7:
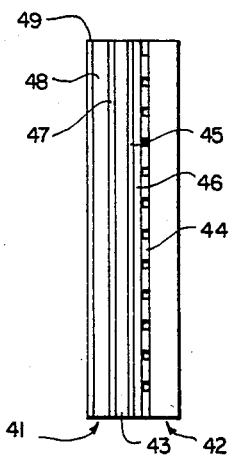
FIG. 7 is an elevation view of a cross-section of an alternative embodiment of a display panel.

Another flat panel construction is illustrated in FIG. 7 in which the multiplier 41 is constructed on the low energy emitter mechanism 42. In this embodiment the space between the emitter and the multiplier is occupied by a dielectric layer 43 instead of a vacuum as in the embodiment of FIGS. 1 & 2. The low energy emitter 42 is constructed in the same manner as emitter 12 to include orthogonal conductors arranged in rows 44 and columns 45 separated by dielectric 46. The dielectric layer 43 is deposited on the emitter in direct contact with the columns 45 and the dielectric 46 in the spaces between the columns. A layer of conductive metal 47 is deposited over the dielectric 43 and a layer of glass 48, is adhered to the metal 47. Holes are then etched through the glass 48, metal 47 and dielectic 43 in alignment with the crossover points of the rows 44 and columns 45. A second layer of conductive metal 49 is then deposited onto the exposed surface of the glass 48. The layer of glass may be semi-conductive material or it may be similar to layer 22 of FIGS. 1 & 2. In the latter case, the combined structure would be baked in a hydrogen atmosphere before the metal layer 49 is applied to give the walls of the holes a secondary surface emission characteristic. When the combined multiplier-emitter is assembled with the phosphor screen and vacuum sealed only the one spacer 26 is required. The dielectric layer 43 can be the same material as the dielectric layer 46, e.g., aluminum oxide, silicon nitride, silicon dioxide, or etc. The metal layers 47 & 49 can be any conductive metal capable of being deposited by evaporation or similar technique, such as aluminum, copper, etc.

For a standard 15 inch square panel the overall thickness of the display is approximately 0.75 to 1 inch. The dimensions for height and width can be as small as 1 inch square or as large as 4 feet square, or larger. Practical display sizes for computer graphic displays would be from 10 to 20 inches square. The resolution of the display can also be selected over a wide range since the resolution is determined by the size and spacing of the holes in the electron multiplier. It is possible to manufacture hole sizes down to 20 micrometers in size. This means that the overall display resolution on a standard 15 inch square panel can be as high as 8000 by 8000 pixels consisting of three dots for each pixel to obtain full color. Higher resolution than 8000 by 8000 color pixels is also possible. Current resolution on the best raster color CRTs is 1024 by 1280 pixels.

The use of an electron multiplier in combination with a low energy electron emitter is advantageous in a flat panel display in that it permits exploitation of the characteristics of reduced cost and increased resolution inherent in the low energy emitter. One cross over point of the emitter conductors and one continuous channel electron multiplier are provided for each pixel in the display. Since the conductors, and consequently the crossover points, can be positioned at very small intervals at low voltage, and since corresponding spacing between holes in the electron multiplier are emminently practical, the resolution of the display can be increased as indicated.

A tunnel emmission device defined by orthogonal conductors offers the advantages of simplicity of construction, ease of manufacture and reduced cost. However, the electron multiplier can be used with a variety of low energy emitters, such as plasmas or heated cathode devices, which include a control matrix to select the areas of electron flow to be transmitted to the multiplier.

While the invention has been described with reference to specifically illustrated preferred embodiments, it should be realized that various changes may be made without departing from the disclosed inventive subject matter particularly pointed out and claimed here below.

I claim:

1. A flat panel display which has an overall resolution of up to 284,000 pixels per sqare inch, said display including means for generating a low energy flow of electrons, said means including low power selection devices for gating the electron flow, said devices being energized intermittently in response to electrical signals of from 2 to 20 volts, multiplying means having a constant bias voltage for multiplying the magnitude of the electron flow, and a phosper screen for receiving the gated electron flow, the means for generating and the multiplying means and the screen being assembled in close proximity in a two-dimensional array and vacuum sealed with the multiplying means sandwiched between the means for generating and the screen.

2. A flat panel display as defined in claim 1 in which the multiplying means is an array of continuous channel electron multipliers.

3. A flat panel display as defined in claim 2 in which the means for generating is of the cold cathode type and includes an orthogonal array of conductors separated by a dielectric.

4. A flat panel display as defined in claim 3 in which the means for generating includes a matrix of rows and columns of conductors with a dielectric there-between.

5. A flat panel display as defined in claim 4 in which the rows and columns are individually selectable to create a positive potential there-between, and each crossover point of a row and a column forms an electron emitter.

6. A flat panel display as defined in claim 5 in which the multiplying means includes a flat plate with a multiplicity of microscopic holes extending therethrough, the material of the plate forming the walls of the holes having a secondary surface emission characteristic.

7. A flat panel display as defined in claim 6 in which the holes define continuous channel electron multipliers and are aligned with the crossover points of the emitter, and there is one continuous channel electron multiplier and one crossover point for each picture element on the screen.

8. A flat panel display as defined in claim 7 in which the phosphor screen includes a glass plate, and the emitter matrix is supported on a substrate, the glass plate and the substrate forming the front and rear surfaces respectively of the panel.

9. A flat panel display as defined in claim 8 in which the electron multiplier includes a flat plate of glass having a composition of approximately 50% lead oxide, approximately 40% silicon dioxide, and approximately 10% alkali oxides, with the holes having an aspect ratio of diameter-to-length of approximately 1 to 20, said plate of glass having a semi-conductive surface produced by baking in a hydrogen atmosphere.

10. A flat panel display as defined in claim 9 in which the electron multiplier includes a layer of conductive metal adhered to the upper and lower surfaces of the plate of glass.

11. A flat panel display as defined in claim 2 in which the electron multiplier is spaced a small distance from the low energy emitter.

12. A flat panel display as defined in claim 11 in which the space between the electron multiplier and the low energy emitter is a vacuum.

13. A flat panel display as defined in claim 11 in which the space between the electron multiplier and the low energy emitter is filled with a dielectric.

14. A flat panel display as defined in claim 13 in which the electron multiplier and the low energy emitter are formed as a unit.

15. For use in a high resolution flat panel display, an electron multiplier comprising a flat plate with microscopic holes extending from one flat surface to the other, the spacing between adjacent holes being microscopic to permit a hole density of up to 284,000 holes per square inch, the diamter-to-length aspect of the holes being on the order of 1 to 20, the axes of the holes extending at an acute angle to the flat surfaces, and a thin metallic electrode adhered to and covering each flat surface of the plate.

16. An electron multiplier as defined in claim 15 in which the material of the plate has a secondary surface emission characteristic.

17. An electron multiplier as defined in claim 15 in which the flat plate is laminated of alternate layers of dielectric and thin sheets of conductive metal, with holes in each layer aligned to form a channel of segments joined by thin metallic electrodes.

18. An electron multiplier as defined in claim 17 in which means is provided for connecting a bias voltage across the plate in progressive increments between the metal sheets.

19. For use in a high resolution flat panel display, an electron emitter-amplifier unit comprising a sheet of dielectric material with an array of tunnel emission devices on one surface and an array of continuous channel multipliers on the opposite surface, the devices in said array being separated by uniform microscopic spaces to permit an array density of up to 284,000 devices per square inch.

20. An electron emitter-amplifier unit as defined in claim 19 in which the tunnel emission devices include an orthogonal array of conductors separated by a thin layer of dielectric.

21. An electron emitter-amplifier unit as defined in claim 19 in which the emission devices include a matrix of rows and columns of conductors with a thin layer of dielectric therebetween, and each crossover point of a row and a column forms an electron emitter.

22. An electron emitter-amplifier unit as defined in claim 21 in which each continuous channel multiplier is aligned with a crossover point.

23. An electron emitter-amplifier unit as defined in claim 22 in which the array of multipliers includes a flat plate with a layer of conductive metal adhered to both surfaces thereof, and microscopic holes extending through the flat plate and both metal layers and the dielectric sheet.

24. An electron emitter-amplifier unit as defined in claim 23 which includes means for connecting a bias voltage across the flat plate, and in which the rows and columns are individually selectable to create a positive potential therebetween.

25. An electron emitter-amplifier unit as defined in claim 24 which includes a glass substrate adhered to the tunnel emission devices to support and protect the unit.

26. A method of making an electron multiplier for a high resolution flat panel display which includes the steps of etching a multiplicity of microscopic holes having a diameter-to-length aspect on the order of 1 to 20 through at least one flat plate in a closely spaced two-dimensional array in which the holes are separated by uniform microscopic spaces to permit a hole density of up to 284,000 holes per square inch, and depositing a thin layer of conductive metal on each flat surface of the plate.

27. A method of making an electron multiplier as defined in claim 26 which includes
treating the material of the flat plate to make it semiconductive.

28. A method of making an electron multiplier as defined in claim 26 which includes
superposing a plurality of the flat plates with the holes in alignment, and
adhering thin sheets of conductive metal between adjacent plates to form a laminated structure of alternating plates and sheets.

* * * * *